(12) United States Patent
Mansjur et al.

(10) Patent No.: US 11,328,007 B2
(45) Date of Patent: May 10, 2022

(54) GENERATING A DOMAIN-SPECIFIC PHRASAL DICTIONARY

(71) Applicant: International Business Machines Corporation, Armonk, NY (US)

(72) Inventors: Dwi Sianto Mansjur, Cary, NC (US); Scott Robert Carrier, Apex, NC (US); Brendan Bull, Durham, NC (US); Andrew Hicks, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 16/267,368

(22) Filed: Feb. 4, 2019

(65) Prior Publication Data

US 2020/0250216 A1 Aug. 6, 2020

(51) Int. Cl.
*G06F 16/36* (2019.01)
*G06F 40/211* (2020.01)
(Continued)

(52) U.S. Cl.
CPC ............ *G06F 16/36* (2019.01); *G06F 40/211* (2020.01); *G06F 40/242* (2020.01); *G06F 40/289* (2020.01)

(58) Field of Classification Search
CPC ...... G06F 16/36; G06F 16/367; G06F 16/374; G06F 40/00; G06F 40/10; G06F 40/106; G06F 40/117; G06F 40/131; G06F 40/151; G06F 40/16; G06F 40/166; G06F 40/20; G06F 40/205; G06F 40/211; G06F 40/216; G06F 40/226; G06F 40/232; G06F 40/237; G06F 40/242; G06F 40/247; G06F 40/268; G06F 40/274; G06F 40/289; G06F 40/30; G06F 40/35; G06F 40/51; G10L 15/04; G10L 15/05; G10L 15/06; G10L 15/063;
(Continued)

(56) References Cited

U.S. PATENT DOCUMENTS 8,874,443 B2 10/2014 Weng et al.
9,129,041 B1 * 9/2015 Cormier ............ G06F 16/24575
(Continued)

OTHER PUBLICATIONS

Rendle, Steffen, "libFM: Factorization Machine Library", http://www.libfm.org, [retrieved Feb. 4, 2019].

*Primary Examiner* — Andrew C Flanders
(74) *Attorney, Agent, or Firm* — North Shore Patents, P.C.

(57) ABSTRACT

Embodiments generally relate to the generation of a domain-specific phrasal dictionary. In some embodiments, a method includes receiving text from a user, wherein the text includes unstructured text of a natural language. The method further includes parsing the text into text chunks. The method further includes sending the text chunks to the user. The method further includes receiving one or more phrase categories and one or more predetermined phrases from the user, wherein each predetermined phrase of the one or more predetermined phrases corresponds to at least one phrase category of the one or more phrase categories. The method further includes comparing the predetermined phrases with the text chunks. The method further includes assigning at least one phrase category of the one or more phrase categories to at least one text chunk. The method further includes sending at least one text chunk and the at least one phrase category that is assigned to the at least one text chunk to the user.

20 Claims, 7 Drawing Sheets

(51) Int. Cl.
*G06F 40/242* (2020.01)
*G06F 40/289* (2020.01)

(58) Field of Classification Search
CPC ... G10L 15/18; G10L 15/183; G10L 15/1815; G10L 15/1822; G10L 15/075; G10L 2015/0631; G10L 2015/0633; G10L 2015/0635; G10L 2015/0638; G10L 2015/088; G10L 2015/086
See application file for complete search history.

(56) References Cited

U.S. PATENT DOCUMENTS

| | | | |
|---|---|---|---|
| 9,330,087 B2 | 5/2016 | El-Sharqwi et al. | |
| 9,342,504 B2 | 5/2016 | Ehsani et al. | |
| 10,599,767 B1* | 3/2020 | Mattera | G06F 40/284 |
| 2004/0024739 A1* | 2/2004 | Copperman | G06F 16/353 |
| 2006/0074656 A1* | 4/2006 | Mathias | G10L 15/183 |
| | | | 704/243 |
| 2008/0275691 A1* | 11/2008 | Summerlin | G06F 16/3337 |
| | | | 704/8 |
| 2009/0094233 A1 | 4/2009 | Marvit et al. | |
| 2012/0265531 A1 | 10/2012 | Bennett | |
| 2013/0268260 A1* | 10/2013 | Lundberg | G06F 40/40 |
| | | | 704/8 |
| 2015/0254555 A1 | 9/2015 | Williams et al. | |
| 2016/0048499 A1* | 2/2016 | Deshmukh | G06F 40/169 |
| | | | 704/9 |
| 2016/0132484 A1* | 5/2016 | Nauze | G06F 40/289 |
| | | | 704/9 |
| 2016/0162456 A1* | 6/2016 | Munro | G06N 20/00 |
| | | | 704/9 |
| 2016/0162457 A1* | 6/2016 | Munro | G06F 16/35 |
| | | | 715/230 |
| 2016/0162458 A1* | 6/2016 | Munro | G06Q 50/01 |
| | | | 715/230 |
| 2017/0004208 A1* | 1/2017 | Podder | G06F 16/367 |
| 2017/0177715 A1* | 6/2017 | Chang | G06F 40/186 |
| 2017/0278514 A1* | 9/2017 | Mathias | G10L 15/22 |
| 2017/0330106 A1* | 11/2017 | Lindsley | G06N 5/02 |
| 2017/0371861 A1* | 12/2017 | Barborak | G06N 3/006 |
| 2018/0060302 A1* | 3/2018 | Liang | G06F 40/289 |
| 2018/0107940 A1* | 4/2018 | Lieberman | G06F 16/338 |
| 2019/0005049 A1* | 1/2019 | Mittal | G06F 16/316 |
| 2019/0163818 A1* | 5/2019 | Mittal | G06F 16/367 |
| 2019/0180195 A1* | 6/2019 | Terry | G06F 16/34 |
| 2019/0213245 A1* | 7/2019 | Oxstrand | G06F 16/22 |
| 2019/0237061 A1* | 8/2019 | Rusak | G06F 40/247 |
| 2019/0318730 A1* | 10/2019 | Hazarika | G10L 15/22 |
| 2019/0392078 A1* | 12/2019 | Methani | G06F 16/3347 |
| 2020/0034749 A1* | 1/2020 | Kumar | G06F 16/93 |

* cited by examiner

| | | 602 | 604 | 606 | 608 | | | |
|---|---|---|---|---|---|---|---|---|
| Phrases | short term apartment | | | 1 | 1 | 1 | | |
| Phrases | spacious mansion | | | | | | 1 | 1 |
| Observed Words | short | | | 1 | | | | |
| Observed Words | term | | | | 1 | | | |
| Observed Words | apartment | | | | | 1 | | |
| Observed Words | spacious | | | | | | 1 | |
| Observed Words | mansion | | | | | | | 1 |
| Unobserved Words | temporary | short | | 1/3 | 1/3 | 1/3 | | |
| Unobserved Words | brief | short | | 1/3 | 1/3 | 1/3 | | |
| Unobserved Words | duration | term | | 1/3 | 1/3 | 1/3 | | |
| Unobserved Words | session | term | | 1/3 | 1/3 | 1/3 | | |
| Unobserved Words | house | apartment | | 1/3 | 1/3 | 1/3 | | |
| Unobserved Words | condo | apartment | | 1/3 | 1/3 | 1/3 | | |
| Unobserved Words | extravagant | spacious | | | | | 1/2 | 1/2 |
| Unobserved Words | large | spacious | | | | | 1/2 | 1/2 |
| Unobserved Words | building | mansion | | | | | 1/2 | 1/2 |
| Unobserved Words | estate | mansion | | | | | 1/2 | 1/2 |
| | outcome | | 1 | 1 | 1 | 1 | 1 | 1 |

GENERATING A DOMAIN-SPECIFIC PHRASAL DICTIONARY

BACKGROUND

A phrasal dictionary may be used to look up words or phrases related to a particular concept represented by a word, words, phrase, or sentence. For example, the word "job" may result in a list of words including, "work," "employment," "task," etc. A domain-specific phrasal dictionary that specializes in a particular field such as medicine, finance, etc. requires specialized experts to build the dictionary based on vocabulary particular to the field. This can be a time consuming and resource intensive process.

SUMMARY

Disclosed herein is a method for generating a domain-specific phrasal dictionary, and system and a computer program product as specified in the independent claims. Embodiments are given in the dependent claims. Embodiments can be freely combined with each other if they are not mutually exclusive.

Embodiments generally relate to the generation of a domain-specific phrasal dictionary. In some embodiments, a method includes receiving text from a user, wherein the text includes unstructured text of a natural language. The method further includes parsing the text into text chunks. The method further includes sending the text chunks to the user. The method further includes receiving one or more phrase categories and one or more predetermined phrases from the user, wherein each predetermined phrase of the one or more predetermined phrases corresponds to at least one phrase category of the one or more phrase categories. The method further includes comparing the predetermined phrases with the text chunks. The method further includes assigning at least one phrase category of the one or more phrase categories to at least one text chunk. The method further includes sending at least one text chunk and the at least one phrase category that is assigned to the at least one text chunk to the user.

In another embodiment, each text chunk of the text chunks includes one or more words, and wherein two or more words of a text chunk are syntactically correlated. In another aspect, the at least one processor further performs operations comprising receiving one or more phrase categories and one or more predetermined phrases during runtime. In another aspect, the at least one processor further performs operations comprising determining for each text chunk one or more observed words, and wherein each observed word includes a word that appears in one of the text chunks. In another aspect, the at least one processor further performs operations comprising determining for each text chunk one or more unobserved words, wherein each unobserved word is a word that is not a word that appears in one of the text chunks, and wherein each unobserved word is a word that has a similar meaning to a word that appears in one of the text chunks. In another aspect, the at least one processor further performs operations comprising: generating one or more confidence scores associated with one or more assignments between phrase categories and text chunks; and sending the confidence scores to the user. In another aspect, the at least one processor further performs operations comprising: generating a dictionary based on the predetermined phrases; and deploying the dictionary in a search engine.

DETAILED DESCRIPTION

Embodiments described herein facilitate the generation of a domain-specific phrasal dictionary. As described in more detail herein, when a system receives unstructured text of a natural language from a user, the system analyzes the unstructured text and assigns phrase categories to portions of the unstructured text. Such assignments are based on comparisons between portions or chunks of the unstructured text to iteratively establish dictionary entries, which include natural language phrases organized by category.

In various embodiments, a system receives unstructured text from a user, parses the text into text chunks, and then sends the text chunks to the user. The system then receives one or more phrase categories and one or more corresponding predetermined phrases from the user. The system compares the predetermined phrases with the text chunks, and assigns a phrase category to each text chunk.

As described in more detail herein, the system further determines observed words, which are words that appear in the text chunks. The system also determines unobserved words, which do not appear the text chunks but have similar meanings to some of the observed words. In various embodiments, the system also generates confidence scores associated with the assignments between phrase categories and text chunks. In various embodiments, the system then sends each text chunk, assigned phrase category, and associated confidence score to the user. After a particular set of predetermined phrases (dictionary entries) are established, the system generates a custom phrasal dictionary based on the predetermined phrases, and deploys the dictionary in a search engine.

Figure 1:
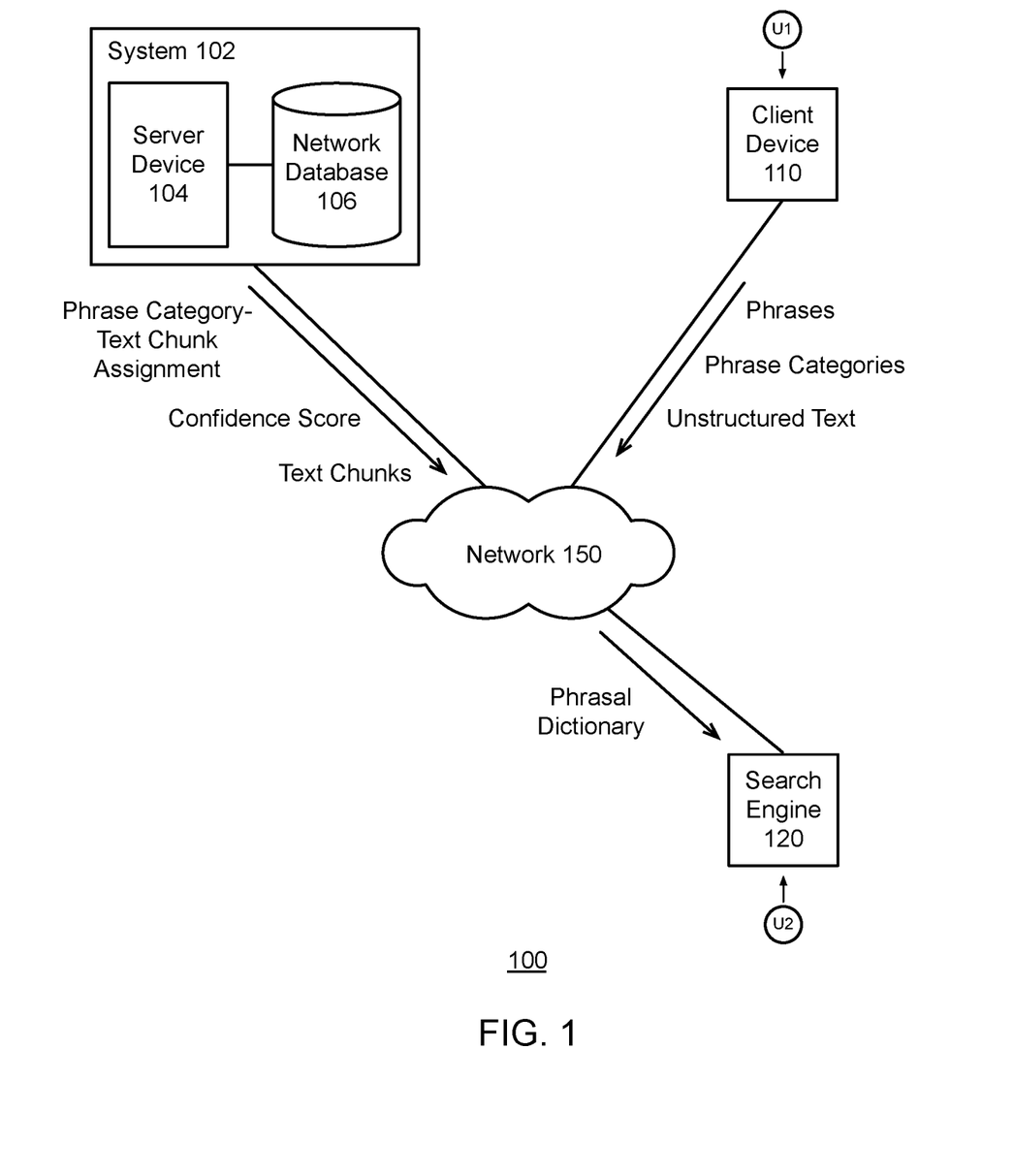
FIG. 1 is a block diagram of an example environment for generating a domain-specific phrasal dictionary, which may be used for embodiments described herein.

FIG. 1 is a block diagram of an example environment 100 for generating a domain-specific phrasal dictionary, which may be used for some implementations described herein. In some implementations, environment 100 includes a system 102, which includes a server device 104 and a database 106. Network environment 100 also includes a client device 110 and a search engine 120, which another user (e.g., user U2) may use for conducting searches. In various embodiments, client device 110 and a search engine 120 may communicate with system 102 and/or may communicate with each other directly or via system 102. Environment 100 also includes a network 150 through which system 102, client device 110, and search engine 120 communicate. Network 150 may be any suitable communication network such as a Wi-Fi network, Bluetooth network, the Internet, etc.

In various embodiments, the system gradually and iteratively constructs a custom domain-specific phrasal dictionary, which may be used in various applications such as in a search engine. As described in more detail herein, system 102 receives unstructured text from a user (e.g., user U1). Example unstructured text may be, "The candidate has a permanent job and is looking for a small rental property." The system parses the text into text chunks, and then sends the text chunks to the user. The user then reviews the text chunks to determine an initial phrase category (e.g., "housing") and one or more corresponding phrases from the user (e.g., "short term apartment," "spacious mansion" etc.), which the user sends to system 102.

The system then receives the initial phrase category and one or more corresponding phrases from the user. The system compares the predetermined phrases with the text chunks, generates confidence scores, and assigns a phrase category to each text chunk. In various embodiments, system 102 generates a confidence score for each potential assignment and selects the assignment with the highest score. System 102 then sends text chunks, a confidence score, and a phrase category of each text chunk to the user. After the user confirms the assignment of the phrase category to each text chunk, system 102 sends the phrasal dictionary to search engine 120. Further embodiments directed to the generation of a domain-specific phrasal dictionary are described in more detail herein.

For ease of illustration, FIG. 1 shows one block for each of system 102, server device 104, database 106, client device 110, and search engine 120. Blocks 102, 104, and 106 may represent multiple systems, server devices, and databases. Also, there may be any number of client devices 110 and search engine 120. In other implementations, environment 100 may not have all of the components shown and/or may have other elements including other types of elements instead of, or in addition to, those shown herein.

While server device 104 of system 102 performs embodiments described herein, in other embodiments, any suitable component or combination of components associated with server 102 or any suitable processor or processors associated with server 102 may facilitate performing the embodiments described herein.

Figure 2:
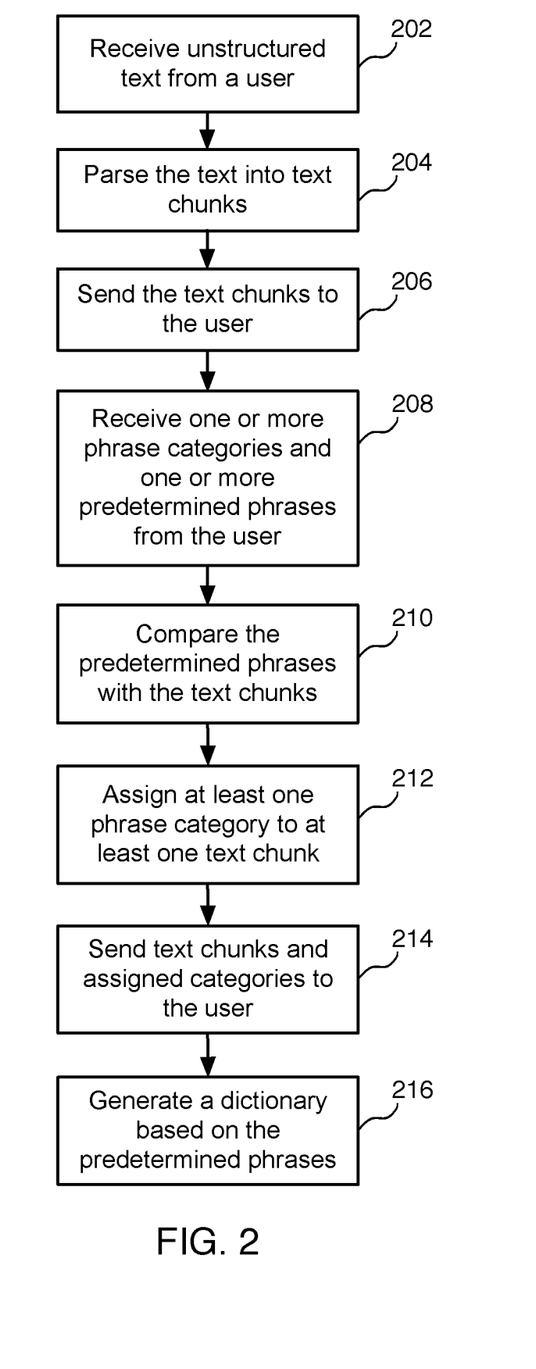
FIG. 2 is an example flow diagram for generating a domain-specific phrasal dictionary, according to some embodiments.

FIG. 2 is an example flow diagram for generating a domain-specific phrasal dictionary, according to some embodiments. As described in more detail herein, the system facilitates the generation of a domain-specific phrasal dictionary by providing a process and interaction with a user such as a subject matter expert in order to customize domain-specific context for the phrasal dictionary. Referring to both FIGS. 1 and 2, a method begins at block 202, where a system such as system 102 receives text from a user, wherein the text includes unstructured text of a natural language. Initially, the system starts from an empty phrasal dictionary with no entries (e.g., no categories, no phrases, etc.).

At block 204, the system parses the unstructured text into text chunks, where each text chunk includes one or more words of a natural language. In various embodiments, the system generates text chunks such that two or more words of a text chunk are syntactically correlated. For example, the system may parse the unstructured text, "The candidate has a permanent job and is looking for a small rental property," into text chunks (e.g., "candidate," "permanent job," "small rental property," etc.

At block 206, the system sends the text chunks to the user. In various embodiments, the user is a subject matter expert who can assist the system in generating an accurate and iteratively improved domain-specific phrasal dictionary. The user analyzes the chunked text and determines, based on the user's expertise, one or more phrase categories and one or more corresponding phrases. As indicated herein, each phrase is an entry in the phrasal dictionary.

At block 208, the system receives one or more phrase categories and one or more phrases from the user. Each phrase corresponds to at least one phrase category. Also, each phrase category and corresponding phrases correspond to one of the text chunks. In various embodiments, the system receives phrase categories and corresponding predetermined phrases during runtime. For example, the system may add different phrase categories and associated phrases to the phrasal dictionary during runtime. As a result, the system may continually build and update the domain-specific phrasal dictionary over time as needed. The system saves time and computational resources by reducing or eliminating the need to train machine-learning models for generating phrases as is required by conventional systems.

Figure 3:
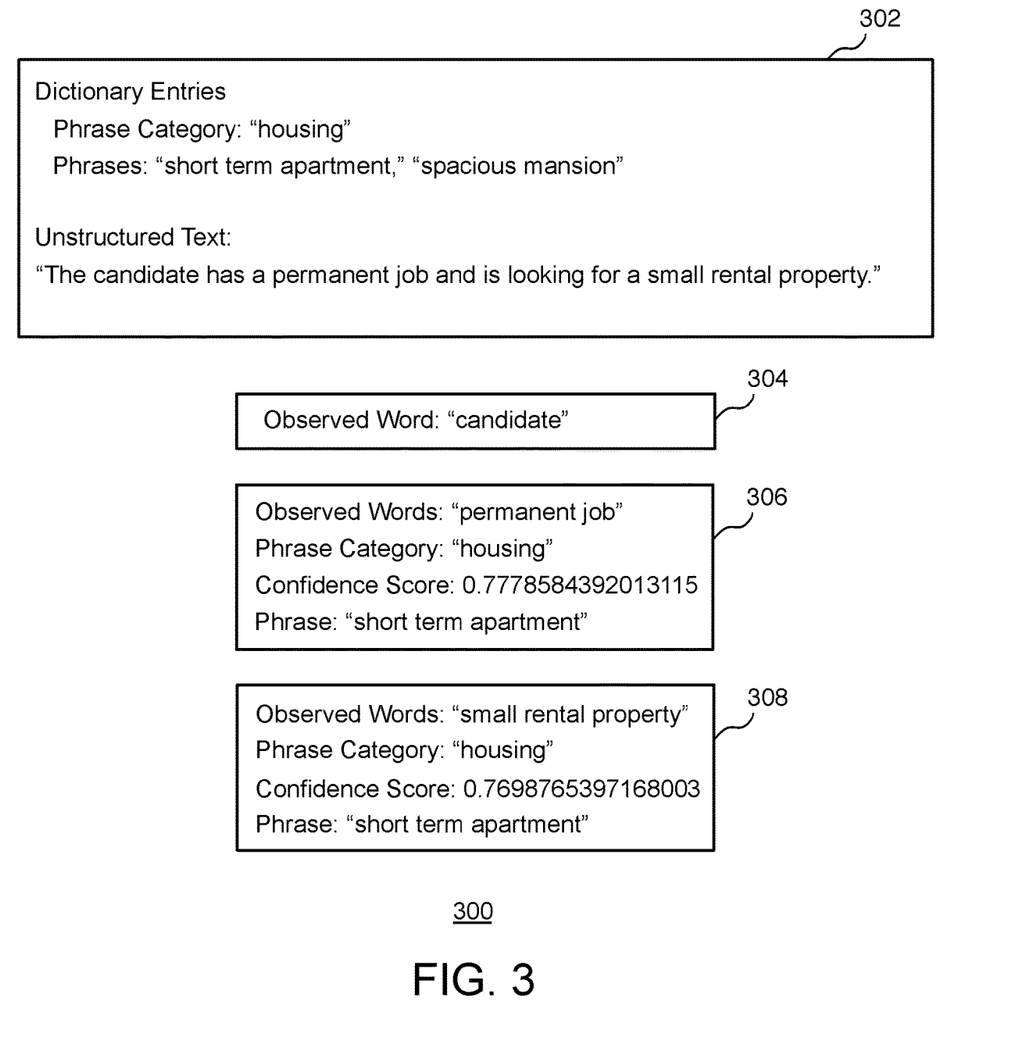
FIG. 3 is an example set of data structures associated with the generation of a domain-specific phrasal dictionary, according to some embodiments.

FIG. 3 is an example set 300 of data structures associated with the generation of a domain-specific phrasal dictionary, according to some embodiments. The following example embodiments relate to a phrasal dictionary where a first or initial dictionary entry is added, which starts an initial version of the phrasal dictionary.

In this example scenario, a person has a new permanent job and is looking for housing. That person may submit the request for housing using unstructured text. For example, as shown in data structure 302, the unstructured text may read, "The candidate has a permanent job and is looking for a small rental property." In the example embodiments described herein, a subject matter expert assisting with the creation of the domain-specific phrasal dictionary submits a request to the system, where the request includes the unstructured text.

In various embodiments, the user provides a phrase category (e.g., "housing") and one or more phrases (e.g., "short term apartment" and "spacious mansion") that are related to the phrase category, which the user sends to the system. As shown, the system associates the phrase category (e.g., "housing") with phrases (e.g., "short-term apartment" and "spacious mansion"). For ease of illustration, two phrases are shown. The number of phrases associated with a given phrase category may vary, depending on the particular implementation.

As described in more detail herein, the system determines for each text chunk one or more observed words, where each observed word includes a word that appears in one of the text chunks. For example, observed words may include each of the words in the unstructured text, "The candidate has a permanent job and is looking for a small rental property."

As shown, a data structure 304 includes a text chunk including the observed word "candidate." A data structure 306 includes a text chunk including the observed words "permanent job." A data structure 308 includes a text chunk including the observed words "small rental property."

Data structure 306 includes the observed words "permanent job," as well as corresponding annotations (e.g., Phrase Category: "housing," Confidence Score: 0.7778584392013115, Phrase: "short-term apartment"). The confidence score is the likelihood that the phrase category (e.g., "housing") matches the observed words (e.g., "permanent job").

As shown, the phrase "short term apartment" is the closest phrase in the current phrasal dictionary that matches the observed words "permanent job."

As shown, the phrase "short term apartment" is the closest phrase in the current phrasal dictionary that matches the observed words "permanent job." As described in more detail herein, the system incrementally constructs the phrasal dictionary. As such, various mistakes (errors) may occur at the beginning of the construction process, and fewer errors are expected at the end of the construction process. In this particular example, the user (e.g., subject matter expert) provides the word "housing" as the first category. Both "small rental property" and "permanent job" phrases have been assigned the category "housing." The phrase "candidate" is not assigned to any category. Thus, the accuracy is ⅓ for the phrase "small rental property" and the error of the housing category is ⅔ for the phrases "permanent job" and "candidate." As more categories are provided for the system, the error rates are expected to go down.

In various embodiments, the actual confident score is the probability that the phrase belongs to a specific category. In this particular example, in the first iteration, where there is only one available "housing" category. The system assigns the score 0.7778584392013115 for the "permanent job" phrase to belong to the "housing" category, because the system is performing semantic matching rather than syntactic matching. The user does not have access to the knowledge base, because it is built into the system. In this case, the knowledge base is constructed using a general online resource rather than a specific medical or financial domain. Thus, one way to interpret the score is to consider the P("permanent job"|"housing" domain)=0.77 and P("small rental property"|"housing" category)=0.76. In fact, one can argue that the confident scores for both phrases are quite similar and both phrases to be equally likely to be coming from the "housing" category. A high error in confident scores at the beginning of the process is expected, because the ultimate goal is to have multiple categories at the end of the dictionary construction process with small error rates.

In various embodiments, text chunks from the unstructured text are scored. The phrases provided by the user are matched to the dictionary and become dictionary entries. As described in more detail below, in various embodiments, a given text chunk may become an entry in the phrasal dictionary before the system deploys the phrasal dictionary.

Data structure 308 includes the observed words "small rental property," as well as data structure 308 also includes annotations (e.g., Phrase Category: "housing," Confidence Score: 0.7698765397168003, Phrase: "short-term apartment"). The confidence score is the likelihood that the phrase category (e.g., "housing") matches the observed words (e.g., "small rental property"). As shown, the phrase "short term apartment" is the closest phrase in the current phrasal dictionary that matches the observed words "small rental property." In various embodiments, text chunks from the unstructured text are scored. The unstructured text (e.g., phrases provided by the user) are matched to the dictionary and become dictionary entries. As described in more detail below, in various embodiments, a given text chunk may become an entry in the phrasal dictionary before the system deploys the phrasal dictionary.

As shown, the system annotates each phrase and each text chunk with a phrase category. As a result, the system annotates phrases that the user originates (e.g., short term apartment," "spacious mansion," etc.) and phrases that the system originates (e.g., "short term apartment," etc.). The phrase category may be referred to as an annotation of a given phrase or text chunk. As shown in this example, the system has annotated the phrases, "permanent job" and "small rental property," and has not yet annotated the text chunk, "candidate."

As described in more detail below, in various embodiments, the system also determines for each text chunk one or more unobserved words, where each unobserved word is a word that is not a word that appears in one of the text chunks. Each unobserved word is a word that has a similar meaning to a word that appears in one of the text chunks. In other words, one or more unobserved words may have lexical similarity (e.g., similar meaning in the same natural language) to a given observed words. For example, the system may determine unobserved words such as "extravagant," "large," etc. from the observed word "spacious." Example embodiments directed to determining unobserved words are described in more detail below. In various embodiments, a given phrase may represent different variations of surface forms with a single representation. A surface form may be defined as a word or words, an acronym or acronyms, a phrase or phrases, a sentence, etc. that is readable in text (e.g., in a sentence, etc.).

In various embodiments, different surface forms may be different variations of same idea or concept, different syntax, wording, etc. For example, the phrase or surface form "part-time work" has an equivalent meaning to different phrases or surface forms such as "part-time job," "temporary assignment," etc.

As described in more detail herein, the system need not capture and store every explicit surface form variation. The system may capture and store some phrases and automatically, without user intervention, generate surface form variations (e.g., unobserved words, etc.) based on existing surface forms.

In various embodiments, the system iteratively adds dictionary entries to the phrasal dictionary over time. Further example embodiments directed to subsequent dictionary entries being iteratively added are described in more detail below in connection with FIGS. 4 and 5.

Referring again to FIG. 2, at block 210, the system compares the phrases with the text chunks. For example, the system compares the observed words in a given phrase (e.g., "spacious") with unobserved words that the system procures (e.g., "extravagant," "large," etc.). Further example embodiments directed to the comparison between phrases and text chunks are described in more detail below.

At block 212, the system assigns at least one phrase category to at least one text chunk. As described in more detail herein, to select a particular phrase-category-to-text-chunk assignment, the system generates one or more confidence scores associated with one or more assignments between phrase categories and text chunks. Note that the phrase "phrase-category-to-text-chunk assignment" be also be referred to as "phrase category-text chunk assignment" or "assignment."

The system then selects the candidate phrase category-text chunk assignments with the highest confidence score. In various embodiments, the system sends the confidence scores to the user along with the text chunk and assigned phrase category. Further example embodiments directed to confidence scores and phrase category-text chunk assignments are described in more detail below.

At block 214, the system sends at least one text chunk and the at least one phrase category that is assigned to the at least one text chunk to the user. The user (e.g., subject matter expert) may then review the assignment to see if the user agrees with the assignment. In some embodiments, the system may then receive an indication from the user whether the user agrees with the assignment, in which case the system adds the text chunk to the phrasal dictionary. In various embodiments, as described in more detail below, the process and steps of FIG. 2 may be repeated until the user (e.g., subject matter expert) considers the list of phrases satisfactory.

At block 216, the system generates a dictionary based on the predetermined phrases. The system may then deploy the dictionary in a search engine.

Figure 4:
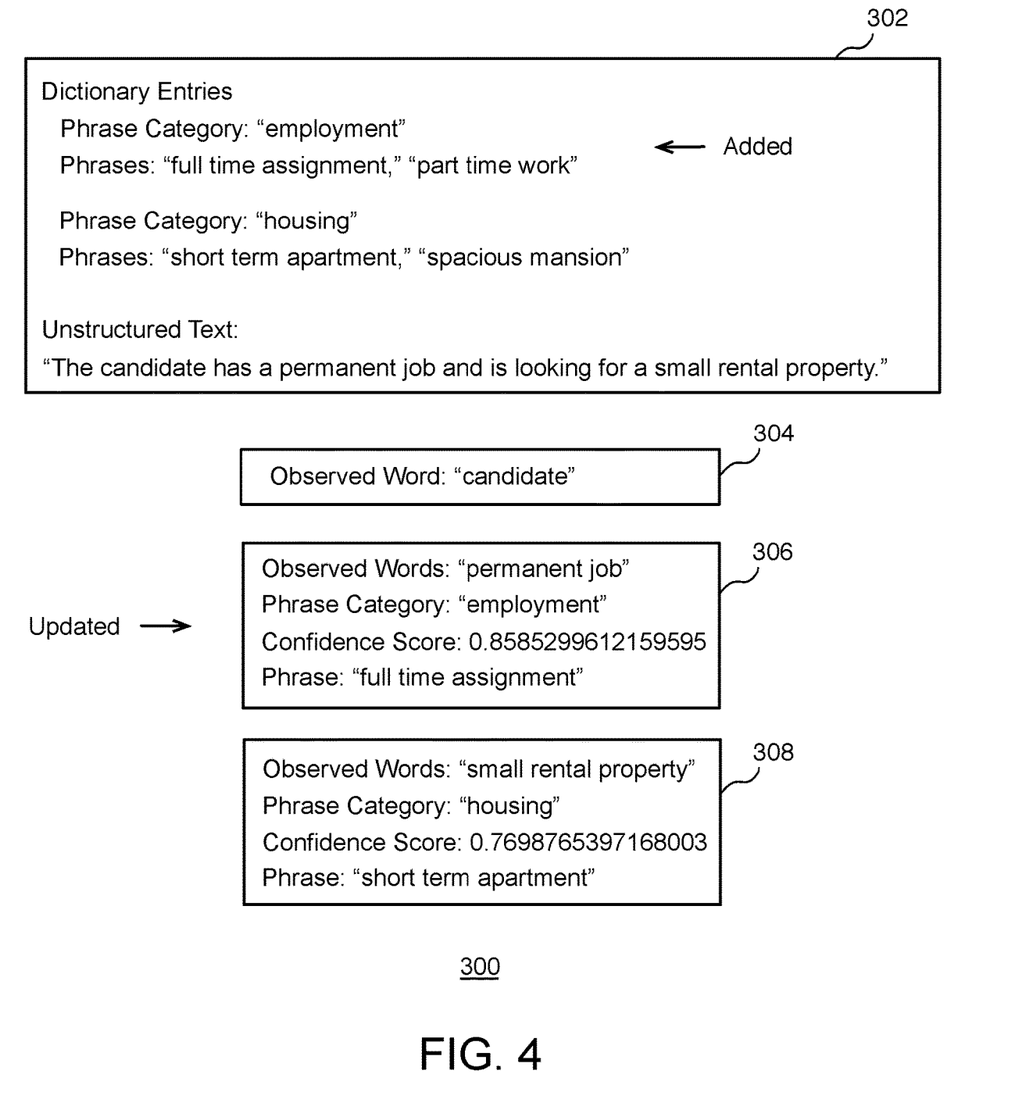
FIG. 4 is an example set of updated data structures associated with the generation of a domain-specific phrasal dictionary, according to some embodiments.

FIG. 4 is an example set 300 of updated data structures associated with the generation of a domain-specific phrasal dictionary, according to some embodiments. The following example embodiments relate to a phrasal dictionary where a second or subsequent dictionary entry is iteratively added to the phrasal dictionary example shown in FIG. 3.

As shown, the user provides an added phrase category (e.g., "employment") and one or more phrases (e.g., "full time assignment" and "part time work") that are related to the phrase category, which the user sends to the system. As shown, the system associates the phrase category (e.g., "employment") with phrases (e.g., "full time assignment" and "part time work"). For ease of illustration, two phrases are shown. The number of phrases associated with a given phrase category may vary, depending on the particular implementation.

As shown, data structure 304 still includes a text chunk including the observed word "candidate." Data structure 306 still includes a text chunk including the observed words "permanent job." Also, data structure 308 still includes a text chunk including the observed words "small rental property."

In this iteration of the phrasal dictionary, data structure 306 has been updated with new annotations based at least in part on the newly added dictionary entry. The user added the new phrase category "employment." In response, the system assigned the phrase category "employment" to the observed words "permanent job" based on the new, higher confidence score of 0.8585299612159595. Note that the current confidence score of 0.8585299612159595 associated with the phrase category "employment" is higher than the previous confidence score of 0.7778584392013115 associated with the previous phrase category "house." Hence, for the observed words "permanent job," the system has replaced the previous phrase category "housing" with the new phrase category "employment." As shown, the phrase "full time assignment" is the now closest phrase in the current phrasal dictionary that matches the observed words "permanent job."

In this iteration of the phrasal dictionary, the system still has not annotated data structure 304. Data structure 308 still includes the observed words "small rental property," as well as corresponding annotations (e.g., Phrase Category: "housing," Confidence Score: 0.7698765397168003, and Phrase: "short-term apartment").

Figure 5:
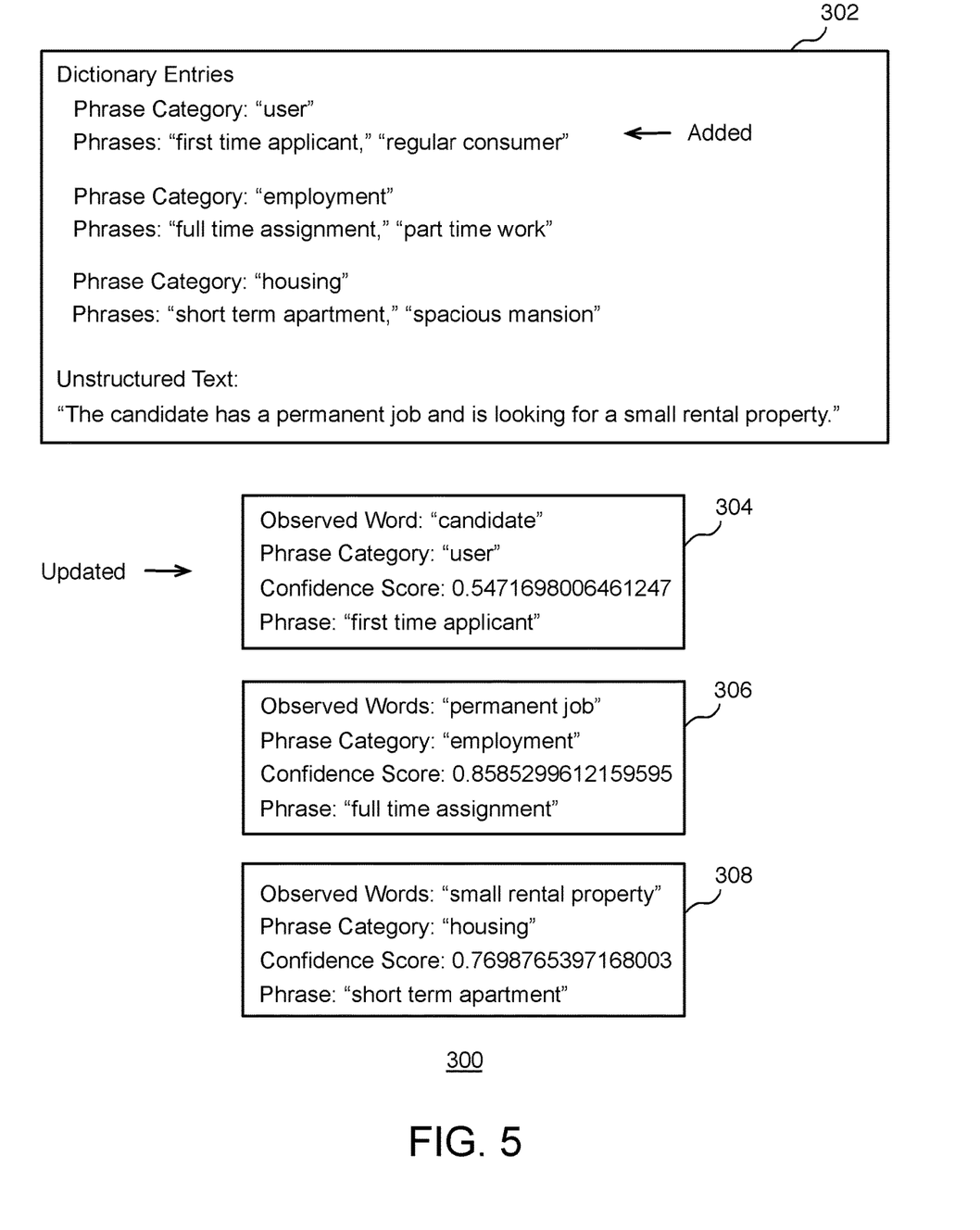
FIG. 5 is an example set of further updated data structures associated with the generation of a domain-specific phrasal dictionary, according to some embodiments.

FIG. 5 is an example set 300 of further updated data structures associated with the generation of a domain-specific phrasal dictionary, according to some embodiments. The following example embodiments relate to a phrasal dictionary where a third or subsequent dictionary entry is iteratively added to the phrasal dictionary example shown in FIG. 3.

As shown, the user provides an added phrase category (e.g., "user") and one or more phrases (e.g., "first time applicant" and "regular consumer") that are related to the phrase category, which the user sends to the system. As shown, the system associates the phrase category (e.g., "user") with phrases (e.g., "full time assignment" and "part time work"). For ease of illustration, two phrases are shown. The number of phrases associated with a given phrase category may vary, depending on the particular implementation.

As shown, data structure 304 still includes a text chunk including the observed word "candidate." Data structure 306 still includes a text chunk including the observed words "permanent job." Also, data structure 308 still includes a text chunk including the observed words "small rental property."

In this iteration of the phrasal dictionary, data structure 304 has been updated with annotations. While the system did not annotate data structure 304 in the initial stage of FIG. 3, the system has annotated data structure 304 based at least in part on the added dictionary entry.

For example, in addition to the observed word "candidate," data structure 304 has been updated to include annotations (e.g., Phrase Category: "user," Confidence Score: 0.5471698006461247, Phrase: "first time applicant"). The confidence score is the likelihood that the phrase category (e.g., "user") matches the observed word (e.g., "candidate"). As shown, the phrase category-text chunk assignments (e.g., observed words "candidate," "permanent job," and "small rental property") from the unstructured text are scored. The phrases provided by the user are matched to the dictionary and become dictionary entries. As indicated above, a given text chunk may become an entry in the phrasal dictionary before the system deploys the phrasal dictionary.

Data structure 306 still includes the observed words "permanent job," as well as corresponding annotations (e.g., Phrase Category: "employment," Confidence Score: 0.8585299612159595, Phrase: "full time assignment").

Data structure 308 still includes the observed words "small rental property," as well as corresponding annotations (e.g., Phrase Category: "housing," Confidence Score: 0.7698765397168003, Phrase="short-term apartment").

In various embodiments, the system performs incremental representation learning in order to continually update and improve the phrasal dictionary over time. The system may subsequently receive more unstructured text during runtime, in which case the system enables a user such as a subject matter expert to confirm if the system assigns phrase categories to new text chunks from the new unstructured text correctly (e.g., if annotated correctly). The system continually updates the phrasal dictionary as needed. Between updates, the system continues to assign existing phrase categories to text chunks from newly received unstructured text.

Figure 6:
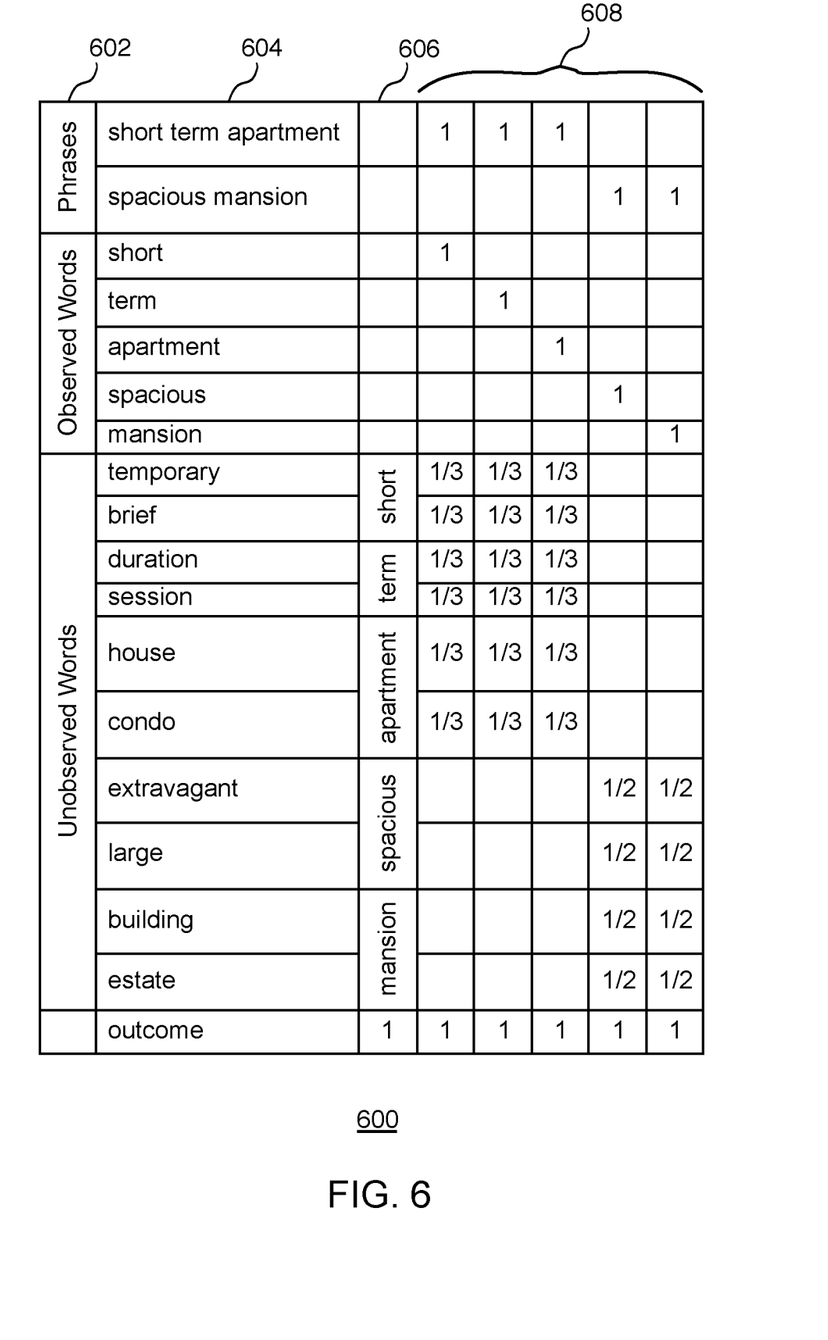
FIG. 6 is an example table associated with the generation of confidence scores, according to some embodiments.

FIG. 6 is an example table 600 associated with the generation of confidence scores, according to some embodiments. Shown in column 602 are labels or headers. These headers demarcate corresponding phrases, observed words, and unobserved words. In this example embodiment, phrases include the words "short term apartment" and "spacious mansion."

Shown in column 604 are the phrases, observed words, and unobserved words. For example, the observed words from the phrases include the words "short," "term," "apartment," "spacious," and "mansion." The observed words include the words "house," "condo," "duration," "session," "temporary," "brief," "extravagant," "large," "building," "estate," and "outcome."

Shown in column 606 are observed words were used to derive the unobserved words. For example, the unobserved words "duration" and "session" are derived from observed word "short." In another example, the unobserved words "condo" and "house" are derived from observed word "apartment."

Shown in column 608 are weighted values for computing confidence scores. For example, in various embodiments, the system assigns each of the phrases and each of the observed words weight values of "1." In this example embodiment, the system assigns each of unobserved words "house," "condo," "duration," "session," "temporary," and "brief" weight values of "⅓." Also, the system assigns each of unobserved words "extravagant," "large," "building," "estate," and "outcome" weight values of "½." The particular weight values may vary, depending on the particular implementation. In some embodiments, the weight value for a given set of unobserved words may be based on one or more predetermined weight-value-assignment policies. For example, in various embodiments, the weighting factors may be based on the number of similar words in a thesaurus that are incorporated in the matrix for a factorization purpose. The "short term apartment" contains three words, e.g., "short," "term," and "apartment." The word "apartment" is actually one among three words in the "short term apartment" phrase. Furthermore, the word "apartment" has been associated with the word "house" and "condo." Thus, both the word "house" and "condo" have similar weight as the word "apartment" (the weight of ⅓).

Another weighting example is the "spacious mansion" phrase. The word "spacious" is a word between two words in the phrase "spacious mansion." The word "large" and the word "extravagant" have been associated with the word "spacious." Thus, both the word "large" and the word "extravagant" have the same weight as the word "spacious" (the weight of ½).

As indicated above, to select a particular phrase category-text chunk assignment, the system generates one or more confidence scores associated with one or more assignments between phrase categories and text chunks. The system then selects the candidate phrase category-text chunk assignments with the highest confidence score.

In various embodiments, the system may utilize a factorization machine library when computing confidence scores to map/assign phrase categories to text chunks. In some embodiments, the system may generate fix-length vector representations of the phrases," which are useful for various machine-learning algorithms.

In some embodiments, the system may utilize a modeling equation for computing confidence scores when assigning phrase categories to text chunks. The following is an example modeling equation that includes quadratic terms and that captures multi-way variable interactions between observed words and unobserved words:

$$\hat{y}(x) := w_0 + \sum_{i=1}^{n} w_i x_i + \sum_{i=1}^{n} \sum_{j=i+1}^{n} \langle v_i, v_j \rangle x_i x_j.$$

In some embodiments, the system may utilize various techniques in order to generate unobserved words, to generate confidence scores for phrase category-text chunk assignments. For example, in some embodiments, the system may utilize various techniques including machine-learning techniques for processing natural languages. The system executes various natural language processing (NLP) tasks for more advanced text processing such as tokenization, sentence segmentation, part-of-speech tagging, named entity extraction, chunking, parsing, co-reference resolution, etc.

In some embodiments, the system may utilize various techniques including maximum entropy classify techniques in order to perform the classification of unobserved words. The system may, for example, convert unstructured text (e.g., "Pierre Vinken, 61 years old, will join the board as a nonexecutive director November 29") to structured text (e.g., Pierre_NNP Vinken_NNP,_, 61_CD years_NNS old_JJ,_, will_MD join_VB the_DT board_NN as_IN a_DT nonexecutive_JJ director_NN Nov._NNP 29_CD._.).

In some embodiments, the system may utilize various techniques such as tagging and chunking techniques in order to parse unstructured text into syntactically correlated words. Such syntactically correlated words may include, for example, a word or words, an acronym or acronyms, a phrase or phrases, as well as noun groups, verb groups, and whole sentences. In an example embodiment, the system may utilize a tagging technique to convert unstructured text (e.g., "Corporation A's Tulsa unit said it signed a tentative agreement.") to structured text (e.g., "Corporation A_NNP's_POS Tulsa_NNP unit_NN said_VBD it_PRP signed_VBD a_DT tentative_JJ agreement_NN").

The system may also utilize a chunking technique to convert the structured text (e.g., "Corporation A_NNP International_NNP Corp._NNP's_POS Tulsa_NNP unit_NN said_VBD it_PRP signed_VBD a_DT tentative_JJ agreement_NN") to structured text that includes text chunks (e.g., "[NP Corporation A_NNP] [NP's_POS Tulsa_NNP unit_NN] [VP said_VBD] [NP it_PRP] [VP signed_VBD] [NP a_DT tentative_JJ agreement_NN]").

Figure 7:
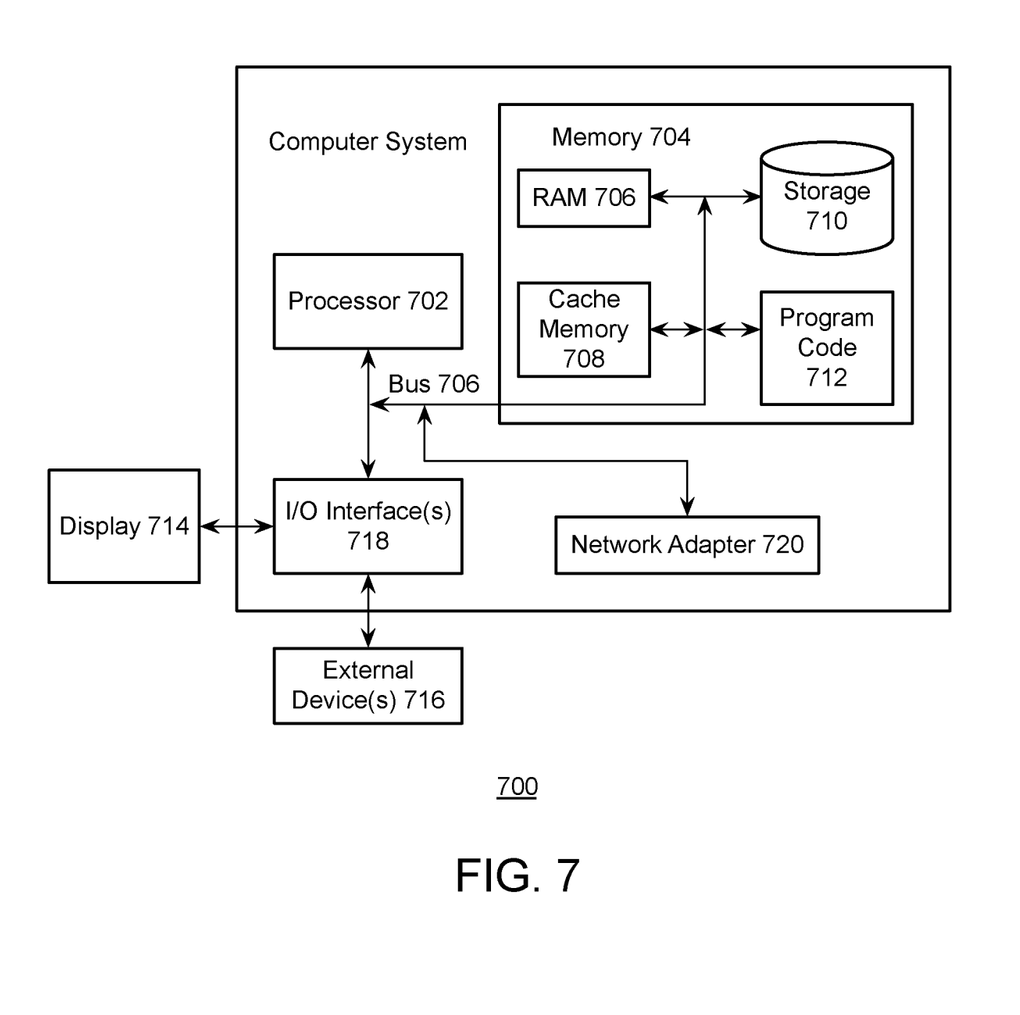
FIG. 7 is a block diagram of an example computer system, which may be used for embodiments described herein.

FIG. 7 is a block diagram of an example computer system 700, which may be used for embodiments described herein. For example, computer system 700 may be used to implement server device 104 of FIG. 1, as well as to perform embodiments described herein. Computer system 700 is operationally coupled to one or more processing units such as processor 702, a memory 704, and a bus 706 that couples to various system components, including processor 702 and memory 704. Bus 706 represents one or more of any of several types of bus structures, including a memory bus, a memory controller, a peripheral bus, an accelerated graphics port, a processor or local bus using any of a variety of bus architectures, etc. Memory 704 may include computer readable media in the form of volatile memory, such as a random access memory (RAM) 706, a cache memory 708, and a storage unit 710, which may include non-volatile storage media or other types of memory. Memory 704 may include at least one program product having a set of at least one program code module such as program code 712 that are configured to carry out the functions of embodiments described herein when executed by processor 702. Computer system 700 may also communicate with a display 714 or one or more other external devices 716 via input/output (I/O) interface(s) 718. Computer system 700 may also communicate with one or more networks via network adapter 720. In other implementations, computer system 700 may not have all of the components shown and/or may have other elements including other types of elements instead of, or in addition to, those shown herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
at least one processor and a computer readable storage medium having program instructions embodied therewith, the program instructions executable by the at least one processor to cause the at least one processor to perform operations comprising:
receiving text from a user, wherein the text includes unstructured text of a natural language;
parsing the text into text chunks, wherein each text chunk comprises one or more observed words from the unstructured text;
sending the text chunks to the user;
receiving one or more phrase categories and one or more predetermined phrases from the user, wherein each predetermined phrase of the one or more predetermined phrases corresponds to at least one phrase category of the one or more phrase categories;
comparing the one or more observed words of each text chunk with words of the predetermined phrases, and wherein the comparing is based at least on machine learning;
computing at least one confidence score for each text chunk based on the comparing, wherein the confidence score indicates a likelihood that a particular phrase category of the one or more phrase categories matches one or more observed words of a particular text chunk, and wherein the computing is based at least on machine learning;
assigning at least one phrase category of the one or more phrase categories to at least one text chunk based on the at least one confidence score; and
sending at least one text chunk and the at least one phrase category that is assigned to the at least one text chunk to the user.

2. The system of claim 1, wherein each text chunk of the text chunks includes one or more words, and wherein two or more words of a text chunk are syntactically correlated.

3. The system of claim 1, wherein the at least one processor further performs operations comprising receiving one or more phrase categories and one or more predetermined phrases during runtime.

4. The system of claim 1, wherein the at least one processor further performs operations comprising determining for each text chunk one or more observed words, and wherein each observed word includes a word that appears in one of the text chunks.

5. The system of claim 1, wherein the at least one processor further performs operations comprising determining for each text chunk one or more unobserved words, wherein each unobserved word is a word that is not a word that appears in one of the text chunks, and wherein each unobserved word is a word that has a similar meaning to a word that appears in one of the text chunks.

6. The system of claim 1, wherein the at least one processor further performs operations comprising:
generating one or more confidence scores associated with one or more assignments between phrase categories and text chunks; and
sending the confidence scores to the user.

7. The system of claim 1, wherein the at least one processor further performs operations comprising:
generating a dictionary based on the predetermined phrases; and
deploying the dictionary in a search engine.

8. A computer program product comprising a non-transitory computer readable storage medium having program instructions embodied therewith, the program instructions executable by at least one processor to cause the at least one processor to perform operations comprising:
receiving text from a user, wherein the text includes unstructured text of a natural language;
parsing the text into text chunks, wherein each text chunk comprises one or more observed words from the unstructured text;
sending the text chunks to the user;
receiving one or more phrase categories and one or more predetermined phrases from the user, wherein each predetermined phrase of the one or more predetermined phrases corresponds to at least one phrase category of the one or more phrase categories;
comparing the one or more observed words of each text chunk with words of the predetermined phrases, and wherein the comparing is based at least on machine learning;
computing at least one confidence score for each text chunk based on the comparing, wherein the confidence score indicates a likelihood that a particular phrase category of the one or more phrase categories matches one or more observed words of a particular text chunk, and wherein the computing is based at least on machine learning;
assigning at least one phrase category of the one or more phrase categories to at least one text chunk based on the at least one confidence score; and
sending at least one text chunk and the at least one phrase category that is assigned to the at least one text chunk to the user.

9. The computer program product of claim 8, wherein each text chunk of the text chunks includes one or more words, and wherein two or more words of a text chunk are syntactically correlated.

10. The computer program product of claim 8, wherein the at least one processor further performs operations comprising receiving one or more phrase categories and one or more predetermined phrases during runtime.

11. The computer program product of claim 8, wherein the at least one processor further performs operations comprising determining for each text chunk one or more observed words, and wherein each observed word includes a word that appears in one of the text chunks.

12. The computer program product of claim 8, wherein the at least one processor further performs operations comprising determining for each text chunk one or more unobserved words, wherein each unobserved word is a word that is not a word that appears in one of the text chunks, and wherein each unobserved word is a word that has a similar meaning to a word that appears in one of the text chunks.

13. The computer program product of claim 8, wherein the at least one processor further performs operations comprising:
generating one or more confidence scores associated with one or more assignments between phrase categories and text chunks; and
sending the confidence scores to the user.

14. The computer program product of claim 8, wherein the at least one processor further performs operations comprising:
generating a dictionary based on the predetermined phrases; and
deploying the dictionary in a search engine.

15. A computer-implemented method for generating a domain-specific phrasal dictionary, the method comprising:

receiving text from a user, wherein the text includes unstructured text of a natural language;

parsing the text into text chunks, wherein each text chunk comprises one or more observed words from the unstructured text;

sending the text chunks to the user;

receiving one or more phrase categories and one or more predetermined phrases from the user, wherein each predetermined phrase of the one or more predetermined phrases corresponds to at least one phrase category of the one or more phrase categories;

comparing the one or more observed words of each text chunk with words of the predetermined phrases, and wherein the comparing is based at least on machine learning;

computing at least one confidence score for each text chunk based on the comparing, wherein the confidence score indicates a likelihood that a particular phrase category of the one or more phrase categories matches one or more observed words of a particular text chunk, and wherein the computing is based at least on machine learning;

assigning at least one phrase category of the one or more phrase categories to at least one text chunk based on the at least one confidence score; and sending at least one text chunk and the at least one phrase category that is assigned to the at least one text chunk to the user.

16. The method of claim 15, wherein each text chunk of the text chunks includes one or more words, and wherein two or more words of a text chunk are syntactically correlated.

17. The method of claim 15, further comprising receiving one or more phrase categories and one or more predetermined phrases during runtime.

18. The method of claim 15, further comprising determining for each text chunk one or more observed words, and wherein each observed word includes a word that appears in one of the text chunks.

19. The method of claim 15, further comprising determining for each text chunk one or more unobserved words, wherein each unobserved word is a word that is not a word that appears in one of the text chunks, and wherein each unobserved word is a word that has a similar meaning to a word that appears in one of the text chunks.

20. The method of claim 15, further comprising:

generating one or more confidence scores associated with one or more assignments between phrase categories and text chunks; and sending the confidence scores to the user.

* * * * *